United States Patent [19]
Blanks

[11] Patent Number: 5,976,325
[45] Date of Patent: Nov. 2, 1999

[54] LASER PRECIPITATION OF SODIUM ALUMINATE SOLUTIONS

[75] Inventor: Keith A. Blanks, Aspinwall, Pa.

[73] Assignee: Aluminum Company of America, Pittsburgh, Pa.

[21] Appl. No.: 08/989,569

[22] Filed: Dec. 12, 1997

[51] Int. Cl.⁶ .................................................. C01F 7/00
[52] U.S. Cl. ........................... 204/157.41; 204/157.51
[58] Field of Search ........................... 204/157.41, 157.4, 204/157.5, 157.51, 158.2

[56] References Cited

FOREIGN PATENT DOCUMENTS 188946  11/1966  U.S.S.R. .

OTHER PUBLICATIONS

Shemyakin, V.S. et al, "Photometric Separation in the Beneficiation of Bauxites From the South Ural Deposit," *Dialog Abstract of Kompleks. Ispol'z. Miner Syr'va* (4), 66–69. (no date available).

Shemyakin, V.S. et al, "Enrichmanet of Bauxites From the North Urals Mines by Photometric Separation," *Dialog Abstract of Kompleks. Ispol'z. Miner Syr'va* (2), 10–14. (no date available).

Ageeva, N.M. et al, "Stabiliazation of Wine by transferring irradiation of carbon dioxide laser by silver–gallium selenide frequency doubler," *Dialog* Abstract of Russian Patent No. 2003676. (no date availabl).

Garetz B.A. et al, "Nonphotochemical, Polarization–Dependent, Laser–Induced Nucleation in Supersaturated Aqueous Urea Solutions," *Physical Review Letters,* vol. 77, No. 16, pp. 3475–3476 (1996) Jul. 1996.

Denny P.E. et al, "Prodn. of nano–scale particles for e.g. catalysts, filters, sensors—by laser–liquid interaction through reactive chamber or plasma jet to fragment molecules of precursor soln. into nonoparticles," *Derwent* Abstract of US 953349 A 19950907. (no date available).

"New Ultrafine Metal Powder Production Process," Penn State Press Release (Oct. 30, 1997). No date aval.

"The 110% Solution," *Science,* vol. 274, p. 1325 (1996) (no date aval).

"Effect of ionizing irradiation on decomposition of aluminate solutions," ACS Abstract of *Met Obogashch.* (1969) 37–8. no month available.

Kuznetsov, S.I. et al, "Decomposing an aluminate solution," ACS Abstract of Russia SU Patent 188946. (No date available).

*Primary Examiner*—Kathryn Gorgos
*Assistant Examiner*—Jonathan Brown
*Attorney, Agent, or Firm*—Glenn E. Klepac; Douglas G. Glantz

[57]  ABSTRACT

A novel laser-induced precipitation process is disclosed for forming purified alumina hydrate from a sodium aluminate solution by illuminating with light wave energy produced by the near infrared wavelength, linearly polarized output of a laser. In one aspect, supersaturated sodium aluminate solution is treated by illuminating with light wave energy to produce a photo-induced nucleation of purified gibbsite aluminum trihydroxide crystals. Near infrared pulses of light wave energy, spatially and temporally overlapped inside the supersaturated sodium alumina, form a precipitated purified alumina hydrate without the need for external seed to be added.

18 Claims, 4 Drawing Sheets

LASER PRECIPITATION OF SODIUM ALUMINATE SOLUTIONS

BACKGROUND OF THE INVENTION

1. Technical Field

This invention relates to a precipitation process for sodium aluminate solutions. In one aspect, this invention relates to a precipitation process for precipitating alumina hydrate from supersaturated sodium aluminate solutions.

2. Background

The Bayer process is a chemical process for refining alumina. The Bayer process takes advantage of several chemical and physical phenomena. Aluminum hydroxide contained in bauxite ore reacts readily with sodium hydroxide under moderate digestion conditions to form sodium aluminate. This reaction reverses at lower temperatures to hydrolyze the sodium aluminate to form $Al(OH)_3$ and regenerate the NaOH, in the presence of aluminum hydroxide seed.

In the Bayer process, the bauxite ore first is prepared by grinding, blending, and slurrying. The prepared bauxite then is brought into contact in a chemical digester vessel with a hot solution of NaOH, which reacts with the $Al(OH)_3$ or AlOOH in the bauxite to form a solution of $NaAlO_2$. Impurities such as oxides, phosphates, and carbonates are precipitated as relatively insoluble compounds. The slurry leaving the digester at above its atmospheric boiling point is flashed to lower pressures. Steam evolved in flashing heats the process liquor as it is pumped to the digester. A solid bauxite residue is separated from the sodium aluminate solution.

The sodium aluminate solution then is cooled further so that the $Al(OH)_4^-$ ions go through dehydroxylation to form $Al(OH)_3$ in precipitation, reversing the reaction that took place in digestion. The $Al(OH)_3$ solids produced in precipitation are classified into a coarse product fraction and finer material. The fines are returned to precipitation for agglomeration and growth. The coarse $Al(OH)_3$ fraction is washed and calcined to produce the $Al_2O_3$ product.

Prior to the precipitation unit operation of the Bayer process, alumina has been dissolved by the digestion of bauxite, and most of the impurities from the bauxite have been removed in clarification. In precipitation, the alumina is recovered as $Al(OH)_3$ crystals grown to particles having the proper size and characteristics for calcination to smelting grade alumina.

In alumina production, the precipitation operation is somewhat unusual technically in that no chemical reagent is added to the solution to form a precipitate, and the operation is not true crystallization because the soluble compound, $NaAlO_2$, does not come out of solution. Instead, the reaction goes as follows:

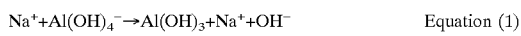

$$Na^+ + Al(OH)_4^- \rightarrow Al(OH)_3 + Na^+ + OH^- \qquad \text{Equation (1)}$$

The structural formula for the aluminate ion is either $Al(OH)_4^-$ or $Al(OH)_4^- \cdot 2\ H_2O$ in solutions having concentrations in the range normal to precipitation. The sodium ion appears unchanged on both sides of Equation (1) but is included in Equation (1) to depict that a moderately concentrated solution of caustic is necessary to the process.

INTRODUCTION TO THE INVENTION

As to precipitation theory, and taking solubility into consideration, a solid phase forms in the solution because its solubility has been exceeded under the prevailing conditions. Exceeding the solubility is a necessary, although not always sufficient, condition for the growth of crystals. FIG. 1 shows a graphical depiction of the relationship between concentration and temperature in the precipitation of $Al(OH)_3$ and the crystallization of other materials. When the concentration is low and the temperature is high, as is represented by a point in Area U on the lower right-hand side of the graphical depiction of FIG. 1, the solution is unsaturated. If crystals of the solute are added to such an unsaturated solution, they will dissolve and the concentration will rise to the solubility curve and no further. The solubility curve is shown by curve S shown at the right in FIG. 1.

Referring to FIG. 1, when sufficient solute is added so that the concentration follows the vertical dashed line and reaches Point P at temperature $T_1$, all of the solute will dissolve, and the solution will still be unsaturated. Cooling to temperature $T_2$ will cause the solution to cross the solubility curve S along the horizontal dashed line, into the meta-stable region indicated as Area M of FIG. 1.

In the meta-stable region of Area M of FIG. 1, the solution is supersaturated so the potential for crystallization exists, but the super-saturation will not adjust spontaneously. Seed must be added for crystallization to be initiated. Once begun, crystallization will continue until the concentration falls to the saturation curve. There it will stop.

Sodium aluminate solutions have a relatively wide meta-stable zone. It is this characteristic that permits high yields from the process. The alumina concentration approaches saturation in the digesters, so that cooling to the operating temperature in clarification brings the liquor well into the meta-stable zone. Because the liquor will be in this condition for several hours, it is imperative that no seed be present in the clarification area.

Referring again to FIG. 1, if concentrations and temperatures move to the left of the super-solubility curve SS, into Area L, nucleation will be spontaneous and crystallization will be rapid and uncontrolled.

Formation of a large quantity of $Al(OH)_3$ does not necessarily mean successful precipitation. Yield is defined as $Al(OH)_3$ converted into smelting grade alumina meeting specifications. The particle form is also important, so product from precipitation should be redefined as $Al(OH)_3$ particles 50 $\mu$m to 150 $\mu$m in diameter having an agglomerate morphology.

Not all of the $Al(OH)_3$ particles can be of product size. A certain number must be recycled to the process as seed since the reaction given in Equation (1) will not proceed at a commercially practical rate in the absence of seed. The seed population also is subject to constraints in that it can be neither too massive (exceeding the capacity of storage equipment) nor too small (process cannot run).

The particle sizes of the seed must fall within certain limits. Seed that is too fine will mean an excess population of particles. However, as some seed grows into product, an equal amount of new seed must be produced. Control of the seed population, while achieving yield, is accomplished using the temperature, the amount of seed, and the particle size distribution of the seed as control variables. In practice, control of the latter two variables typically is not precise. The solids content of the seed slurry varies in the manufacturing plant, sometimes from minute to minute, so when charging is done on a volumetric basis, the amount of seed added is not well controlled.

It is an object of the present invention to provide a precipitation process for sodium aluminate solutions.

It is an object of the present invention to provide a precipitation process for sodium aluminate solutions for liberating alumina hydrate from solution.

Another object of this invention is to provide a precipitation process for supersaturated sodium aluminate solutions in the Bayer process for purifying alumina.

It is an object of the present invention to provide a precipitation process for supersaturated sodium aluminate solutions in the Bayer process for purifying alumina, which is seedless.

It is a further object of the present invention to provide a precipitation process for supersaturated sodium aluminate solutions in the Bayer process for purifying alumina in high yield.

It is a further object of the present invention to provide a precipitation process for supersaturated sodium aluminate solutions in the Bayer process for purifying alumina in high yield and preferred particle sizes and morphology.

It is a further object of the present invention to provide a precipitation process for supersaturated sodium aluminate solutions to produce purified gibbsite.

These and other objects and advantages of the present invention will become more apparent to those skilled in the art in view of the following detailed description and the accompanying drawings.

SUMMARY OF THE INVENTION

The process of the present invention for forming a precipitated alumina hydrate includes providing a sodium aluminate solution and treating the sodium aluminate solution by illuminating with light wave energy produced by the near infrared wavelength, linearly polarized output of a laser to form a precipitated alumina hydrate. In one aspect, the process of the present invention forms aluminum trihydroxide.

Supersaturated sodium aluminate solution is treated by illuminating with light wave energy to produce a photo-induced nucleation of purified gibbsite crystals. Infrared pulses of light wave energy, spatially and temporally overlapped inside the supersaturated sodium aluminate solution, precipitate purified alumina hydrate without the need for external seed to be added.

DETAILED DESCRIPTION

Figure 1:
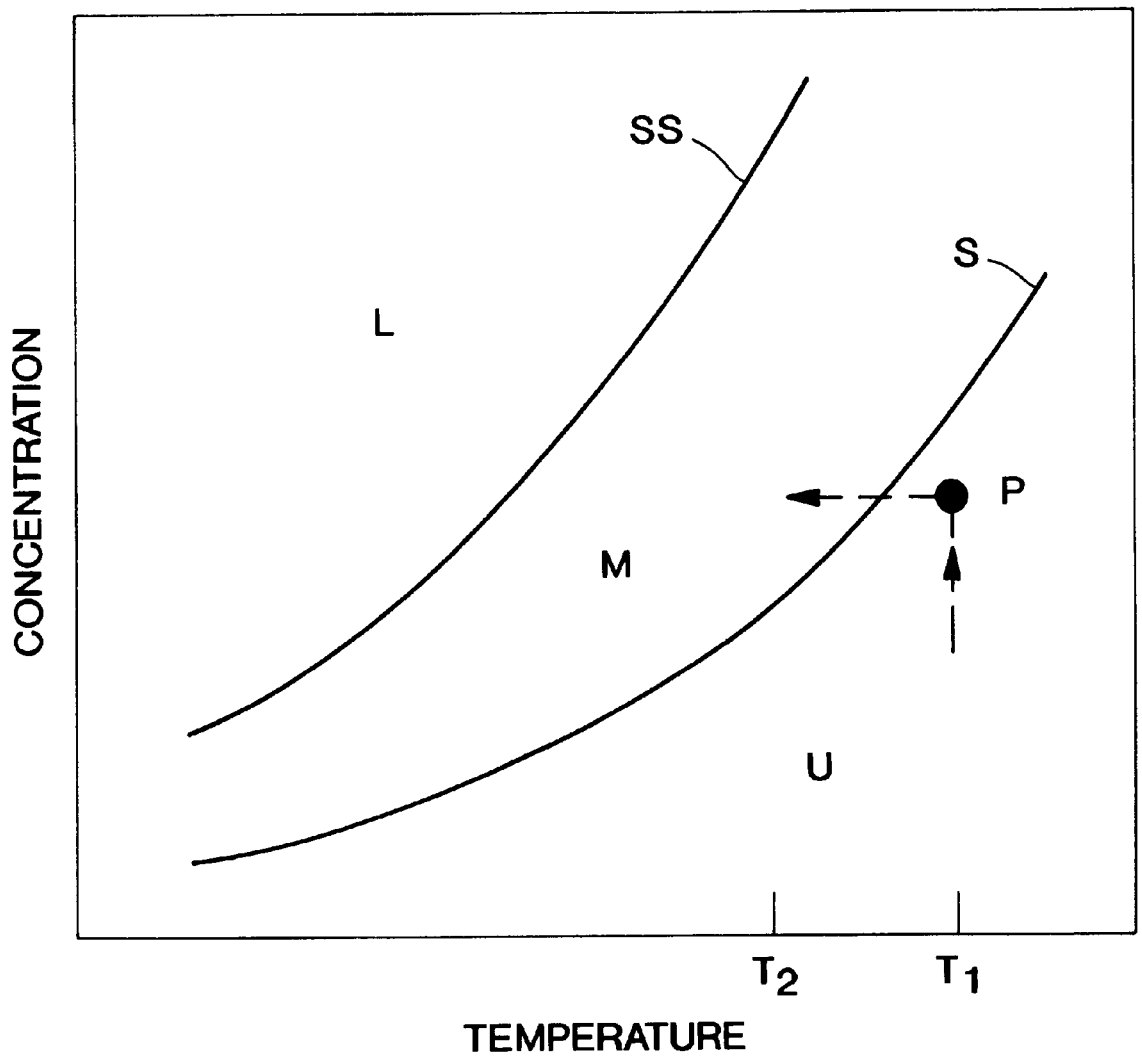
FIG. 1 is a graphical depiction of the relationship between concentration and temperature in the precipitation of $Al(OH)_3$.

Now, a novel laser induced precipitation process has been discovered and developed for the precipitation of sodium aluminate solutions. In one aspect, the novel laser induced precipitation process is seedless for the precipitation of supersaturated sodium aluminate solutions in the Bayer process for purifying alumina.

The process of the present invention for forming a precipitated alumina hydrate includes providing a sodium aluminate solution and treating the sodium aluminate solution by illuminating with light wave energy produced by the near infrared wavelength, linearly polarized output of a laser to form a precipitated alumina hydrate. In one aspect, the process of the present invention forms aluminum trihydroxide. In one aspect, a Ti-sapphire laser is preferred.

In the laser induced seedless precipitation process of the present invention, near infrared pulses of light wave energy, spatially and temporally overlapped inside supersaturated sodium aluminate solution, produce a photo-induced nucleation of purified alumina hydrate crystals. These resulting purified alumina hydrate product crystals subsequently serve as seed for preferred product crystals growth. In one aspect, the laser induced seedless precipitation process of the present invention produces a photo-induced nucleation of purified gibbsite crystals.

By near infrared wavelengths, it is meant wavelengths in the range of about 0.8 to 4 microns.

As used herein, the term "alumina hydrate" refers to hydrated aluminum oxide, or $Al_2O_3 \cdot xH_2O$, wherein x varies in the range of about 0.5 to 3. The term "gibbsite" refers to gamma alumina trihydrate or $Al_2O_3 \cdot 3H_2O$.

In the laser induced seedless precipitation process of the present invention, the laser infrared pulses of light wave energy preferably are produced by the 1.000 micron wavelength, linearly (plane) polarized output of a Ti-Sapphire laser. Other lasers which may be used are any laser which may be mode-locked so to emit sub-nanosecond pulses of near infrared light.

The wavelengths used in the precipitation process of the present invention include 0.8 to 3.55 microns. The wavelength is important in respect to absorbance strength.

Below about 0.8 micron wavelength, the absorption of water is increased. Bayer liquor can be viewed as on the order of 60% water by weight. Accordingly, below about 0.8 micron wavelength, the nucleation process is quenched. At that place below the wavelength range used in the process of the present invention, the water of the Bayer liquor begins to rob most of the photons.

Above about 3.55 microns wavelength, the preferred absorption to produce the specific nucleation in the process of the present invention does not take place.

Accordingly, the wavelengths used in the precipitation process of the present invention are in the range of about 0.8 to 3.55 microns, preferably in the range of about 0.9 to 2.0 microns, more preferably in the range of about 1.0 micron, plus or minus 10 nanometers, i.e., more preferably in the range of about 0.990 to 1.010 microns, with a Ti-Sapphire (Titanium-Sapphire) laser system.

Below about 0.8 micron wavelength, water is the dominant absorber. At wavelengths below about 0.8 micron, little or no energy is pumped into the hydroxyl.

An important lower limit is found at about 0.9 micron wavelength in respect to the hydroxyl absorption for a wide bandwidth laser.

A wavelength of about 1.0 micron is critical for hydroxyl absorption.

Above about 2.0 microns wavelength, optical interference fringe spacing increases which decreases the precipitation of the process of the present invention.

Above about 3.55 microns wavelength, hydroxyl absorption becomes low.

Laser system bandwidth is important with the laser systems used to produce the specific nucleation in the process of the present invention, because it allows for selective pumping of energy into the hydroxyl. For example, a Nd:YAG (Neodymium Yttrium, Aluminum, Garnet) laser system has a wider band width than a Ti-Sapphire (Titanium-Sapphire) laser system. However, energy transferred to the water of the Bayer liquor takes away from the energy transferred to the specific nucleation operation of the process of the present invention.

The precipitation process of the present invention has been observed to work well with a Nd:YAG laser system using 1.064 microns wavelength. The precipitation process of the present invention has been observed to work well with a Ti-Sapphire (Titanium-Sapphire) laser system using 1.022 microns wavelength.

It has been found that using a wavelength of 1.022 microns with a Ti-Sapphire laser system provided a five orders of magnitude increase in absorbance strength, which significantly enhanced destruction of undesirable organics and also significantly enhanced alumina hydrate precipitation.

The Ti-Sapphire laser system is tunable. Wavelengths may be selected from about 0.8 micron to about 1.1 microns. The Ti-Sapphire laser system is tunable as to wavelengths within this range, plus or minus 10 nanometers.

Another laser system which may be used is Yb-YAG (Ytterbium Yttrium, Aluminum, Garnet). Other laser systems which may be used are Er-YAG (Erbium YAG), Ho-YAG (Holmium YAG), Nd-Glass, Nd-YLF (Neodymium Yttrium, Lithium, Fluoride), or Nd-YVO (Neodymium Yttrium, Vanadate).

It has been found that gamma and ultra-violet radiation do not work well in Bayer liquor. Gamma and ultra-violet radiation do not work well in Bayer liquor because of the absorption. For example, the mean free path of the penetration of ultra-violet light in Bayer liquor is on the order of only a few microns. The penetration depth of the radiation into Bayer liquor is on the order of only about a micron.

The penetration depth of the radiation with infrared light into Bayer liquor is on the order of six inches and more.

The laser induced seedless precipitation process of the present invention provides advantages of increased growth rates, increased yield, decreased incubation times, and all this together with the unexpected result of no requirement for external seed to be added.

It has been observed that the laser induced seedless precipitation process of the present invention produces advantages of diffusion limited (no agitation) growth rates of about 1.0 micron per hour which exceeds circulated seed growth.

The precipitation process of the present invention employs a laser treatment process properly to introduce infrared light into green Bayer liquor, e.g., such as by way of example from the first source facility, to provide enhancements in alumina yield of as much as 50 grams/liter without the addition of seed. It has been found that laser induced nucleation of seed particles produces an observed post laser treatment seedless precipitation, which has achieved alumina yields up to 16 grams/liter in 20 hours.

The laser induced seedless precipitation process of the present invention produces decreased incubation times, which are decreased from conventional incubation times by 48 hours.

The laser induced seedless precipitation process of the present invention also provides an in situ destruction process for undesirable organic compounds naturally occurring in the alumina refining process. The laser treatment impulsively oxidizes or cracks these undesirable organic compounds. The laser treatment creates hydroxy radicals which oxidize or crack these undesirable organic compounds. By cracking is meant large molecular weight organic compounds are broken apart so that they are metastable radicals and subsequently decay into stable hydrocarbon gases. In the Bayer Refining process, hydrate active organic impurities are generally considered as inhibitors to alumina trihydrate precipitation. Circumvention of the effects of such impurities is therefore a highly desirable objective.

Unlike green Bayer liquor, synthetic liquors are not observed to undergo seedless precipitation when laser treated with either infrared or visible (green) light. However, subsequent seeding of laser treated synthetic liquors, e.g., such as from a third source facility, is observed to yield hydrate particles which agglomerate less than hydrate particles produced from an untreated seeded liquors. Post laser treatment of synthetic liquor containing organic/inorganic impurities, re-introduced by dilution with spent Bayer liquor, was observed to initiate seedless (photo-induced nucleation) precipitation.

Morphological results show preferred forms of gibbsite for the hydrate particles obtained from the laser treated, unseeded green Bayer liquors.

Scanning Electron Microscopy (SEM) of hydrate particles obtained from laser treated, unseeded green Bayer liquor shows particulates to be predominately hexagonal single crystal gibbsite, with diameters typically 15–20 microns after a non-agitated 20 hour growth cycle at 74° C. The diffusion limited growth rate for these crystals, approximately 1.0 $\mu$m/hr, exceeds that measured for an agitated seeded process (0.2 $\mu$m/hr), and for a white liquor process (0.5 $\mu$m/hr).

Figure 2:
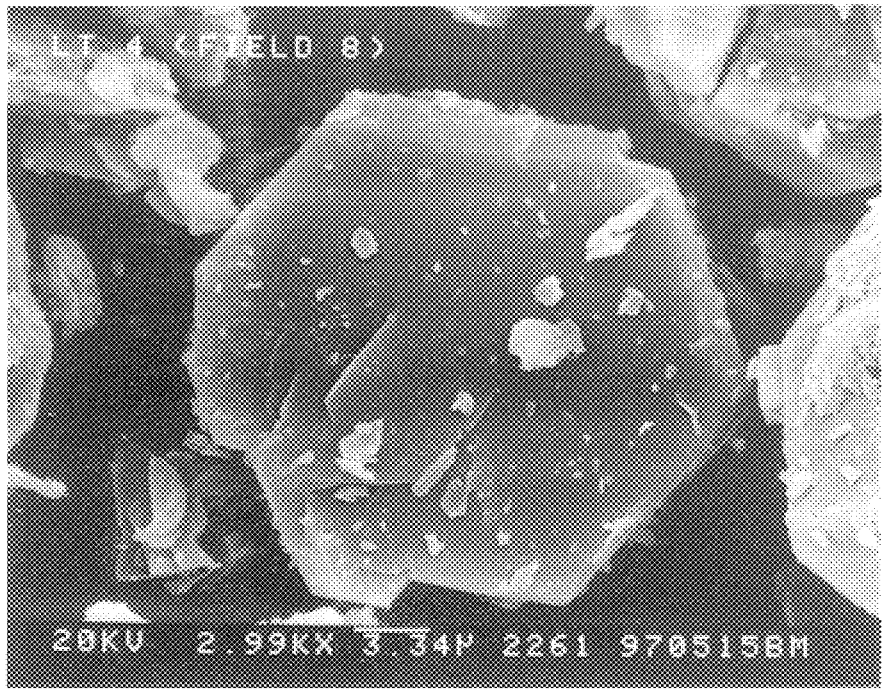
FIG. 2 shows a representative single crystal gibbsite particle obtained by the seedless laser treatment process of the present invention.
Figure 3:
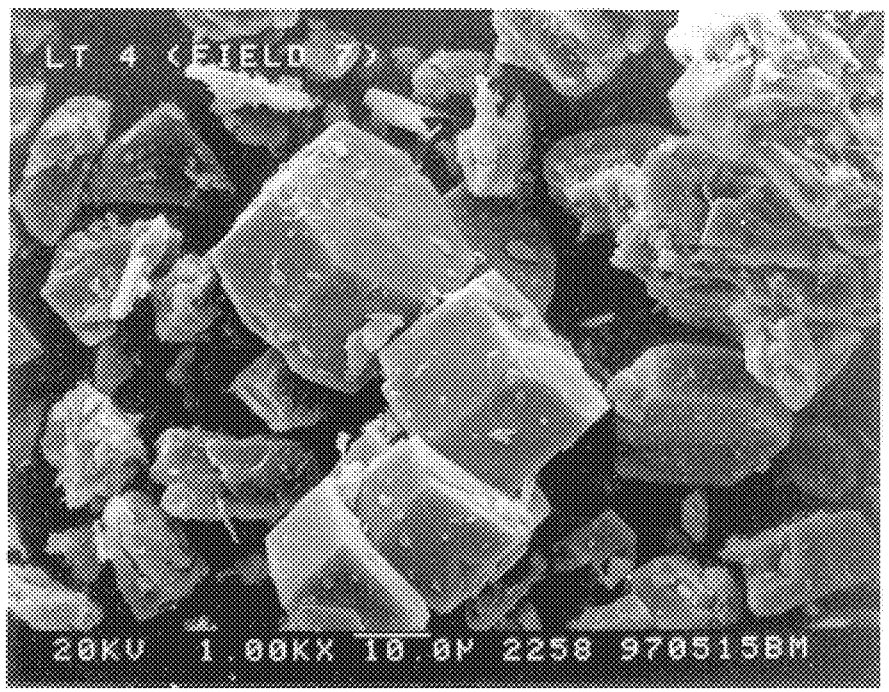
FIG. 3 shows a collection of single crystal gibbsite particles obtained by the seedless laser treatment process of the present invention.

FIGS. 2 and 3 show a Scanning Electron Microscopy (SEM) photograph of hydrate particles obtained from the laser treated, unseeded green Bayer liquor. FIGS. 2 and 3 show the particulates to be predominately hexagonal single crystal gibbsite.

Gibbsite $Al(OH)_3$ is without question the most valuable and desirable of the minerals found in bauxite. Gibbsite's relatively high solubility under moderate digestion conditions makes gibbsite the mineral of choice in bauxites.

The mechanism contributing to the laser induced precipitation or "self-seeded precipitation" of the process of the present invention appears to be the impulsive circumvention of the rate limiting step in crystal nucleation in the crossing of a free energy barrier separating the meta-stable fluid from the crystal phase. Frequently, the free energy barrier to crystal nucleation in a supersaturated system is lowered by preparing a more super-saturated solution, thereby enhancing the thermodynamic driving force for crystallization. However, some recurrent consequences of the highly super-saturated state are the rapid growth of the nucleated crystallites and a tendency to form aggregates rather than crystals. For solution conditions where nucleation does not occur in an unperturbed system, laser induced localized density variations are found to enhance the route to crystal nucleation in supersaturated sodium aluminate solutions. Post nucleation diffusion-limited growth is greatly increased over rates attainable through the introduction of small seed crystals. The macroscopic conditions of the solution are such that single crystal gibbsite of near perfect morphology is formed. The process of the present invention includes an in situ method for active local modulation of the supersaturation state such that stimulated homogenous crystal nucleation occurs under solution conditions generally opposing nucleation.

The specific nucleation in the process of the present invention is part of an impulsively generated very high frequency ultra sound inside the Bayer liquor liquid. The very high frequency ultra sound generated inside the Bayer liquor liquid can be observed with the energy variations which push around the hydrate particles. Wave energy is overlapped, in time and in space, and forms overlap regions. Optical interferences establish localized energy variations which set up in the density variations within the liquid. The ultrasound forms in the relaxation of the density fluctuation. Accordingly, the laser energy driven process appears not only to be a photo process but also an ultrasonic process. It has been observed that the overlap regions provide preferred nucleation in the process of the present invention for producing gibbsite crystals.

As part of the development of the process of the present invention, YAG laser induced oxidation was used on green Bayer liquor in an in situ technique for oxidizing organic compounds. Oxidation yields as measured by changes in total organic carbon content (TOC) were low, and the Ti-Sapphire laser produced measurable TOC decreases. Mass spectroscopic analysis of the off-gas generated during laser treatment provides results supporting oxidation and cracking of organic compounds.

In general, laser induced oxidation targets organic molecules containing hydroxyl groups (OH) for free hydroxyl radical production. The free radicals target additional organics for subsequent oxidation and cracking. In contrast to traditional photo-catalytic techniques that utilize ultraviolet light to dissociate organics, laser induced oxidation employs infrared light for optically exciting hydroxyls and for the impulsive generation of coherent ultrasound within the liquid.

Figure 4:
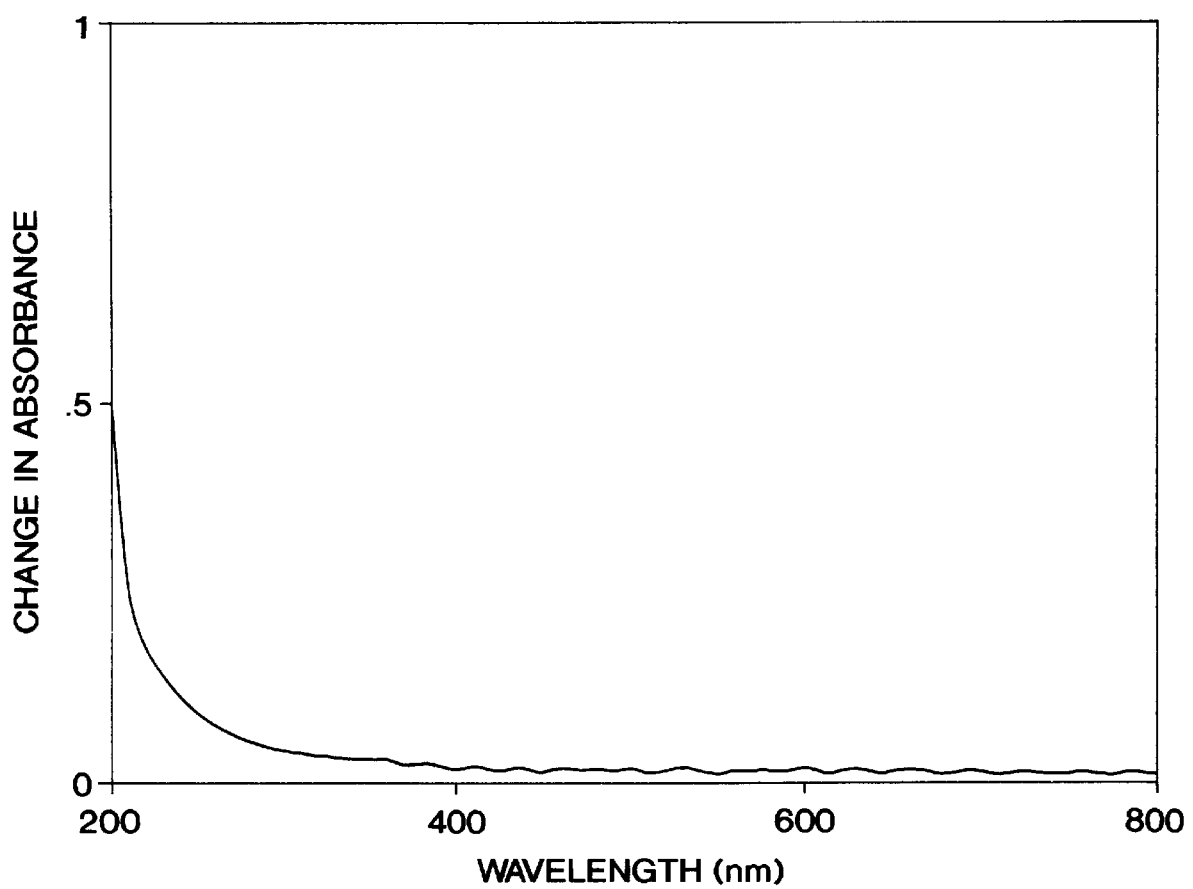
FIG. 4 shows a graphical depiction of the change in ultraviolet—visible absorbance spectrum for spent first source Bayer liquor Untreated Standard minus Laser Treated at a wavelength of 1.000 μm.
Figure 5:
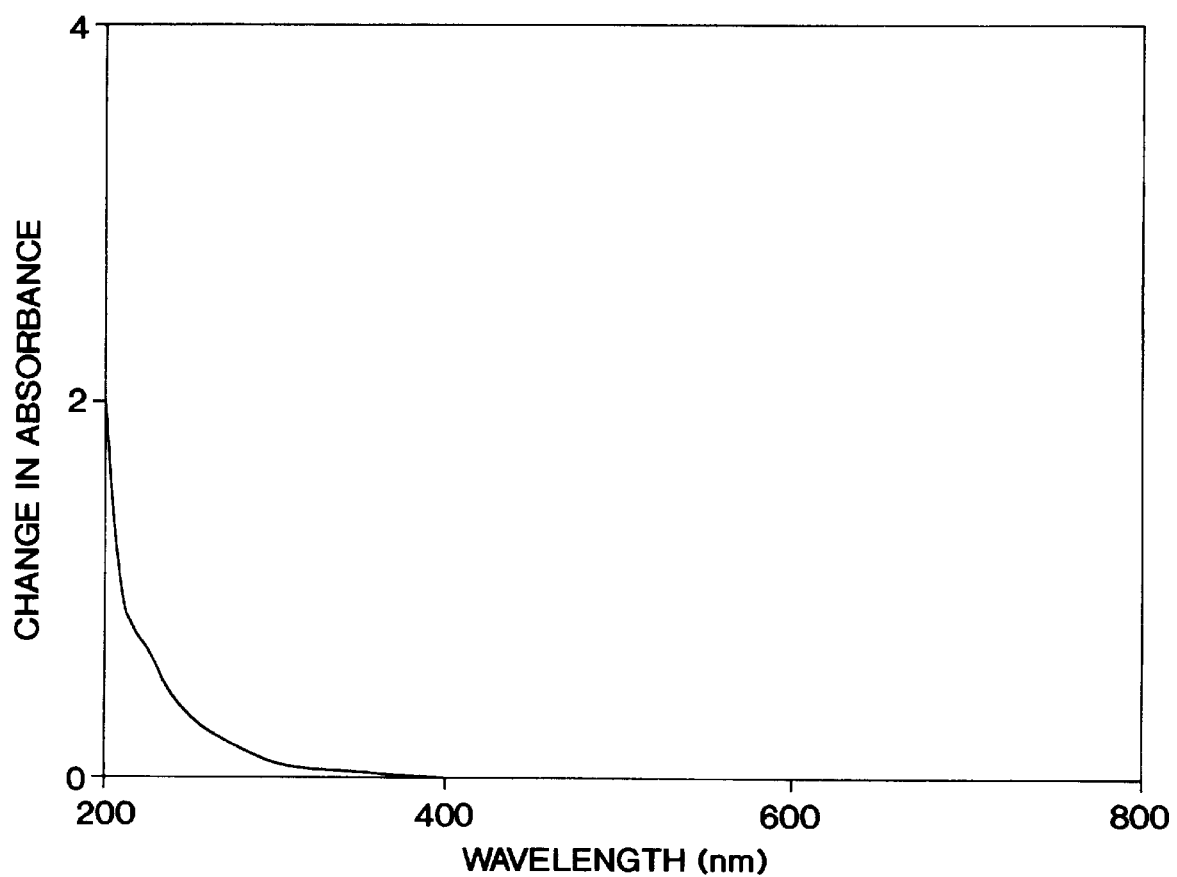
FIG. 5 shows a graphical depiction of the change in ultraviolet—visible absorbance spectrum for spent second source Bayer liquor Untreated Standard minus Laser Treated at a wave-length of 1.000 μm.

The precise mechanism contributing to oxidation and cracking remains unclear. However, as shown in FIGS. 4 and 5, laser treatment produces large, measurable changes (logarithmic scale) for organic contaminants in the optical absorbency of spent Bayer liquor in the 200–400 nanometer region, a wavelength region generally associated with the ultraviolet-visible absorbance spectrum of humic and fulvic acids. FIG. 4 shows change in ultraviolet—visible absorbance spectrum for spent first source Bayer liquor for Untreated Standard minus Laser Treated at a wavelength of 1.000 $\mu$m. FIG. 5 shows change in ultraviolet-visible absorbance spectrum for spent second source Bayer liquor for Untreated Standard minus Laser Treated at a wavelength of 1.000 $\mu$m.

Liquor analysis for the respective samples is contained in Table 1.

TABLE 1

Solution Concentration for Untreated and Laser Treated Green Bayer Liquor

| Sample | T.O.C. (g/l) | Total Caustic (g/l) | $Al_2O_3$ (g/l) |
|---|---|---|---|
| First source (spent) Standard | 8.2 | 217.9 | 29.5 |

TABLE 1-continued

Solution Concentration for Untreated and Laser Treated Green Bayer Liquor

| Sample | T.O.C. (g/l) | Total Caustic (g/l) | $Al_2O_3$ (g/l) |
|---|---|---|---|
| First source (spent) Laser Treated | 7.5 | 198.4 | 27.4 |
| Second source (spent) Standard | 20.1 | 210.8 | 31.8 |
| Second source (spent) Laser Treated | 19.5 | 198.7 | 29.6 |

The first source and second source spent liquor laser treatment were performed at a wavelength $\lambda=1.000$ $\mu$m for 15 minutes.

The data show a reduction in Total Organic Content because of laser treatment, which in conjunction with UV-Visible absorbance spectra indicates the in-situ destruction of organics.

An untreated sample subjected to like constraints (no seed and no agitation while being held in a 74° C. heat bath for 20 hours) was not observed to precipitate.

Impurities, such as hydrate active organics (HAO) are widely considered adversely to effect hydrate yield. Therefore, understanding the inter-relationship between the observed organic alteration (oxidation/cracking) and the laser induced precipitation, or, more precisely stated "self-seeded precipitation," is of importance.

Laser induced nucleation of seed particles is the mechanism for the observed post laser treatment seedless precipitation, although the diffusion limited growth rates ($\approx 1$ $\mu$m/hr) of the hydrate particles did not correlate with presently known Bayer process precipitation fundamentals.

Nucleation as a defined process has difficulties in measurement. In nucleation, a relatively small number of molecules of a substance become oriented into the basic structure of a crystal. If there are enough molecules, the nucleus is viable and the surfaces of this submicroscopic structure provide places where similar molecules can find a thermodynamically stable condition. So growth begins. How this process of nucleation starts and how many molecules are required to form a viable nucleus are largely matters of conjecture.

Nuclei also can be supplied by breaking fragments or dendrites from the surface of larger crystals. This process is called secondary nucleation. Scanning electron micrographs of $Al(OH)_3$ crystals can show a large number of very fine particles on the surfaces of the larger crystals. It may be that these dendrites can be broken off to form seed.

Nuclei are necessary to the Bayer process precipitation, as a brief calculation can demonstrate. For a process yield of 60 g/L $Al_2O_3$, an average particle diameter of 70 $\mu$m, and each particle composed of 15 $\mu$m crystallites, the average particle will contain crystallites grown from just over 100 nuclei. At a density of 2.42 g/cm$^3$ for $Al(OH)_3$, the yield will require $2.11 \times 10^8$ product particles per liter. About $2 \times 10^{10}$ nuclei must be formed in each liter of the solution. This number is the same order of magnitude as the experimentally determined rates of nucleation.

Nucleation is highly temperature dependent, and relatively few nuclei are formed if the temperature exceeds 75° C.

Nuclei do not form rapidly in the absence of seed. Seed allows the solution to remain in the meta-stable region for long periods. Increasing the seed charge by a factor of ten increases the nucleation rate by a factor of less of two. Accordingly, secondary nucleation would appear not to be an important factor, because the number of collisions in which dendrites are broken off should increase at least as rapidly as the seed population.

EXAMPLE I

For the evaluation of laser induced precipitation in synthetic liquors, several liters of strong white liquor were prepared and then diluted to the typical third source plant operating parameters for alumina trihydrate having one micron average particle size, which are shown in Table 2.

TABLE 2

| Synthetic liquor concentrations. | | |
|---|---|---|
| Liquor type | Total Caustic (g/l) | $Al_2O_3$/TC |
| Lab. "Strong" | 352.0 | 0.667 |
| Third source White Liquor | 150.0 | 0.550 |

Referring to Table 2, the Strong liquor was made from C-31 hydrate. The Strong liquor and NaOH solutions were equilibrated at 46° C. prior to combining to achieve alumina trihydrate having one micron average particle size concentration.

The data show starting parts for evaluation.

EXAMPLE II

Several undiluted strong white liquor samples were laser treated in an attempt to elucidate importance of Total Caustic and alumina concentration in the laser induced seedless precipitation process.

The infrared pulses of light wave energy were produced by the 1.064 micron wavelength, linearly polarized output of a Nd:YAG laser.

Two (2) samples of synthetic white liquor, from the third source facility ("Third source white liquor"), and "strong" synthetic liquor were laser treated. One sample of each liquor was laser treated for 15 minutes at 46° C., while the remaining sample was laser treated for 30 minutes at 46° C. Sample temperatures were maintained within plus or minus 2° C. by thermostatically controlled heat tape attached to the 125 ml fused quartz sample cell. Following a 20 hour stay in a 46° C. heat bath, all samples, including the accompanying untreated standard, were filtered through Whatman No. 42 filter paper, in order to dry, weigh, and identify any precipitant. However, in contrast to re-digested green Bayer liquor, none of these samples was observed to undergo seedless precipitation when laser treated with infrared (1064 nm) light.

Although undermining some details of the proposed laser induced seed nucleation hypothesis, these results also call attention to a previously mentioned issue: specifically, the interrelationship between the observed alteration (oxidation/cracking) organic impurities and the observed laser induced precipitation process.

The data show the infrared induced mechanism for white liquor is different from that of Bayer liquor.

EXAMPLE III

Organic and inorganic impurities were re-introduced at moderate levels, by diluting 220 ml of strong white liquor with 30 ml of spent first source Bayer Liquor. See Table 3.

TABLE 3

| Liquor concentrations. | | |
|---|---|---|
| Liquor type | Total Caustic (g/l) | $Al_2O_3$/TC |
| "Strong" | 352.0 | 0.667 |
| First source spent | 242.0 | 0.134 |

Referring to Table 3, the Strong liquor was made from C-31 hydrate. The Strong liquor and NaOH solutions were equilibrated at 60° C. prior to mixing. The Bayer liquor was filtered (No. 42) prior to combining.

The data show starting points prior to mixing.

One 125 ml sample was laser treated for a total of 15 minutes at 60° C. while the remaining 125 ml was utilized as the untreated standard. Both samples were subsequently held in a water heat bath for 20 hours at 60° C., and then filtered for precipitants, which were dried and weighed. On a weight basis, laser treatment enhanced yield by an additional 2.5 g/l, while a titration analysis showed a 12 g/l enhancement to alumina yield See Table 4.

TABLE 4

| Liquor concentrations. | | |
|---|---|---|
| Liquor type | Total Caustic (g/l) | $Al_2O_3$/TC |
| Untreated Standard | 354.0 | 0.606 |
| Laser Treated | 382.0 | 0.529 |

Referring to Table 4, the solution concentrations for "Strong" synthetic liquor were diluted with Spent Bayer liquor after 20 hours in 60° C. heat bath.

The data show a decrease in $Al_2O_3$ concentration because of the laser treatment.

Although a large disparity exists between the two analyses, laser treatment does enhance hydrate yield when impurities common to the Bayer process are present at low to moderate levels. Such impurities change optical absorbance characteristics of the solution. Some of the disparity could arise from the nucleation of nanoscale hydrate.

Although laser treatment of synthetic third source white liquor did not result in seedless precipitation, laser treatment followed by seeding and agitation by mechanical stirring was found to produce hydrate particles that agglomerate less than hydrate particles produced from untreated seeded synthetic third source white liquor. Although the particle size for all samples was approximately the same, the degree of agglomeration for the hydrate particles from laser treated samples was less than that for an untreated sample.

Table 5 shows solution concentrations for three laser treated samples and the untreated sample. Note that all samples were seeded with 2 g/l of an organic free, fine crystalline hydrated alumina, having a median particle size of 0.25 μm to 0.30 μm.

TABLE 5

Liquor concentrations.

| Liquor Type | Total Caustic (g/l) | Al$_2$O$_3$/TC |
|---|---|---|
| Third source White Liquor "pre-seeded levels" | 150.0 | 0.550 |
| Untreated | 160.3 | 0.206 |
| LT-1 | 159.9 | 0.206 |
| LT-2 | 164.2 | 0.205 |
| LT-3 | 157.6 | 0.205 |

Referring to Table 5, the solution concentrations are shown for laser treated and untreated synthetic third source white liquors.

The data show post precipitation titration analysis.

The SEM micro-graphs for alumina trihydrate having one micron average particle size material indicated differences in the physical properties of laser treated and untreated samples, and the physical properties were determined of the hydrate produced by the seedless laser treatment of green Bayer liquor.

FIGS. 2 and 3 show SEM images for the hydrate particles produced for a 30 minute laser treatment.

FIG. 2 shows a representative single crystal gibbsite particle obtained by the seedless laser treatment process of the present invention. The hexagonal structure as shown in FIG. 2 for the single crystal gibbsite particle produced by the seedless laser treatment process of the present invention was obtained from actual plant liquors treated by the process of the present invention.

The existing Bayer process does not produce or yield single crystals.

The seedless laser treatment process of the present invention produces the hexagonal crystal structure shown in FIG. 2, thereby showing that nucleation is provided and facilitated so that the gibbsite in solution can crystallize. Single crystals are nucleated. The single crystals can be viewed as taking on the hexagonal structure shown in FIG. 2. The crystal growth onto the single crystals of hexagonal structure having minimum free surface energy will be pure gibbsite.

FIG. 3 shows a collection of single crystal gibbsite particles obtained by the seedless laser treatment process of the present invention. Solution concentrations are presented in Table 6.

The hydrate particles were observed to be hexagonal single crystals, and x-ray diffraction indicated the structure to be gibbsite. Average diameter of individual hydrate crystals was 15–20 μm, which on an elementary basis gives a diffusion limited growth rate of approximately 1.0 μm/hr for the 20 hour precipitation cycle. Typical growth rates for the conventional Bayer process are in the 0.2–0.5 μm/hr range. Observed agglomerates resulting from the process of the present invention were composed of hydrate crystals, some with diameters exceeding 30 μm.

TABLE 6

Solution Concentration for Unseeded Unstirred Precipitation

| Sample | Total Caustic (g/l) | Al$_2$O$_3$ (g/l) | Al$_2$O$_3$ Yield (g/l) |
|---|---|---|---|
| First source (green) Standard | 227.5 | 162.5 | 0.0 |
| First source (spent) Laser Treated | 231.7 | 152.6 | 13.3 |

The first source spent liquor laser treatment was performed at a wavelength λ=1.000 μm for 30 minutes. The approximate ultrasonic frequency was 570 MHZ.

Table 6 shows the liquor analysis for Unseeded Unstirred Precipitation. All samples are re-digested first source Green.

X-ray diffraction analysis shows the precipitate from laser treatment to be gibbsite.

The data show that the laser treated solution does undergo self-seeded precipitation Scanning Electron Microscopy of hydrate particles obtained from laser treated, unseeded green Bayer liquor shows particulates to be predominately hexagonal single crystal gibbsite, a morphology not normally associated to Bayer process precipitants.

The hydrate particle diameters are typically 15–20 microns after a 20 hour, non-agitated growth cycle at 74° C. The primary diffusion limited growth rate for the laser induced "self-seeded" process greatly exceeds those for the existing seeded, agitated Bayer process.

The products of the seedless nucleation, i.e., self-seeding precipitation, of the process of the present invention are purer than when using externally introduced seed because of the contaminants which are introduced by the additions of external seed.

Externally introduced seed generally does not contain the idealized crystalline structure needed to form the pure product provided by the process of the present invention. The process of the present invention uses the gibbsite which is in solution to produce a seed crystal in situ, and that seed crystal has the idealized structure.

The novel laser induced precipitation process of the present invention has applications to the precipitation and crystallization of supersaturated solutions other than supersaturated sodium aluminate solutions.

While the invention has been described in conjunction with several embodiments, it is to be understood that many alternatives, modifications, and variations will be apparent to those skilled in the art in light of the foregoing description.

Accordingly, this invention is intended to embrace all such alternatives, modifications, and variations which fall within the spirit and scope of the appended claims.

What is claimed is:

1. A process for forming a precipitated alumina hydrate, comprising:

(a) providing a sodium aluminate solution; and (b) illuminating said sodium aluminate solution with light wave energy produced by the near infrared wavelength, linearly polarized output of a laser to form a precipitated alumina hydrate where no external seed is added.

2. The process for forming a precipitated alumina hydrate as set forth in claim 1 wherein said precipitated alumina hydrate comprises aluminum trihydroxide.

3. The process for forming a precipitated alumina hydrate as set forth in claim 1 wherein said sodium aluminate solution comprises supersaturated sodium aluminate solution.

4. The process for forming a precipitated alumina hydrate as set forth in claim 3 wherein said supersaturated sodium aluminate solution comprises supersaturated sodium aluminate solution from the Bayer process for refining bauxite.

5. The process for forming a precipitated alumina hydrate as set forth in claim 1 wherein said illuminating with light wave energy to form a precipitated alumina hydrate comprises producing a photo-induced nucleation of purified gibbsite crystals.

6. The process for forming a precipitated alumina hydrate as set forth in claim 1 wherein said illuminating with light wave energy comprises producing infrared pulses of light wave energy, spatially and temporally overlapped inside said supersaturated sodium aluminate solution.

7. The process for forming a precipitated alumina hydrate as set forth in claim 1, wherein said laser is a Ti-Sapphire laser.

8. The process for forming a precipitated alumina hydrate as set forth in claim 1 wherein said illuminating with light wave energy to form a precipitated alumina hydrate comprises illuminating at an energy level of about 500 to 700 milliwatts.

9. The process for forming a precipitated alumina hydrate as set forth in claim 1, wherein said laser is a Yb-YAG laser.

10. The process for forming a precipitated alumina hydrate as set forth in claim 1 further comprising oxidizing organic compounds in said sodium aluminate solution.

11. The process for forming a precipitated alumina hydrate as set forth in claim 1 further comprising decreasing the ratio of total caustic to aluminum oxide concentration to less than one without adding external seed.

12. The process for forming a precipitated alumina hydrate as set forth in claim 11 comprising decreasing said ratio of total caustic to aluminum oxide concentration from three or more to less than one without adding external seed.

13. The process for forming a precipitated alumina hydrate as set forth in claim 1 wherein said illuminating step comprises a diffusion limited crystal growth rate of at least about one micron per hour and an incubation period of less than about 20 hours.

14. A process for forming a precipitated aluminum trihydroxide, comprising:
(a) providing a supersaturated sodium aluminate solution; and
(b) illuminating said sodium aluminate solution with light wave energy produced by the near infrared wavelength, linearly polarized output of a laser to form a precipitated aluminum trihydroxide where no external seed is added.

15. The process for forming a precipitated aluminum trihydroxide as set forth in claim 14, wherein said illuminating with light wave energy to form a precipitated aluminum trihydroxide comprises producing a photo-induced nucleation of purified gibbsite crystals.

16. The process for forming a precipitated aluminum trihydroxide as set forth in claim 14, wherein said illuminating is with light wave energy comprises producing infrared pulses of light wave energy, spatially and temporally overlapped inside said supersaturated sodium aluminate solution.

17. The process for forming a precipitated aluminum trihydroxide as set forth in claim 14, wherein said illuminating with light wave energy to form a precipitated alumina hydrate comprises illuminating with a laser selected from the group consisting of a Ti-Sapphire laser and a Yb-YAG laser.

18. A process for forming a precipitated aluminum trihydroxide, comprising:
(a) providing a supersaturated sodium aluminate solution; and
(b) establishing pulses of light wave energy, spatially and temporally overlapped, inside said supersaturated sodium aluminate solution by illuminating with light wave energy in the near infrared wavelength from the linearly polarized output of a laser to oxidize organic compounds and to form a precipitated aluminum trihydroxide, thereby producing a photo-induced nucleation of purified gibbsite crystals, wherein no external seed is added.

* * * * *